June 14, 1966  F. G. DOCHAT  3,256,509
CONNECTOR FOR JOINING WIRE TO FOILS
Filed Jan. 13, 1964
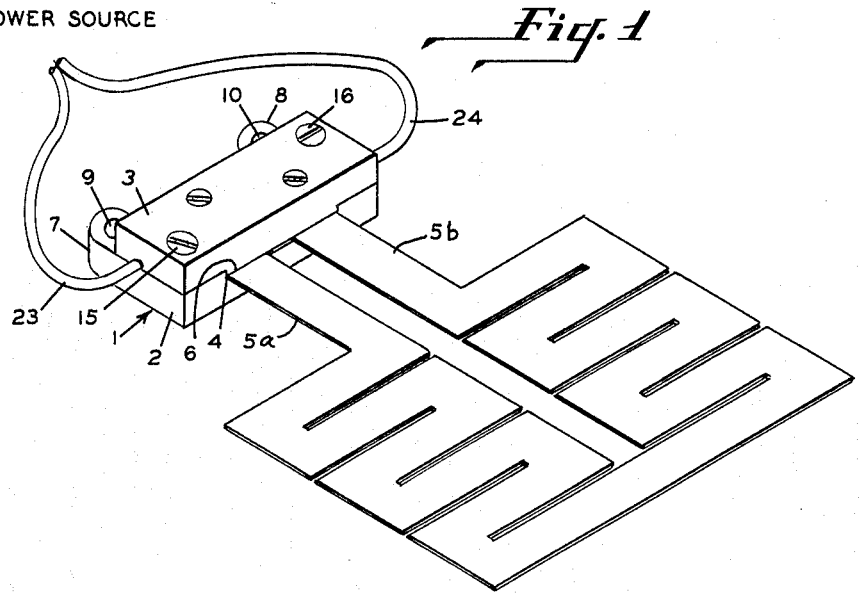
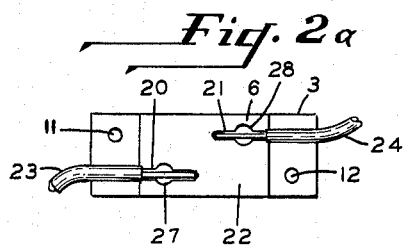
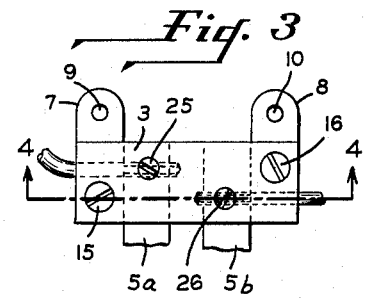
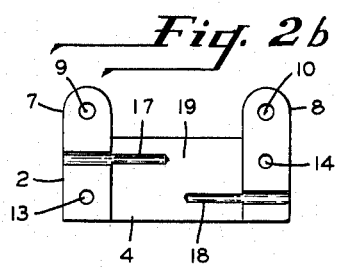
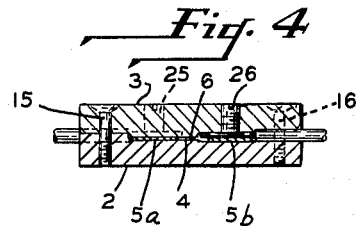
INVENTOR.
FRED G. DOCHAT
BY
Theodore L. Thomas 3,256,509
CONNECTOR FOR JOINING WIRE TO FOILS
Fred G. Dochat, East Hempfield Township, Lancaster County, Pa., assignor to Armstrong Cork Company, Lancaster, Pa., a corporation of Pennsylvania
Filed Jan. 13, 1964, Ser. No. 337,422
3 Claims. (Cl. 339—150)

This invention relates generally to the field of electrical conductor securing devices, and more particularly to an improved terminal block construction which permits the electrical and mechanical attachment of electrical conductors in a secure and rapid manner. Still more particularly the invention relates to a simplified two-part connecting means for repeated use in attaching power source wires to thin foil heater electrical leads.

The connection of power source wires to thin foil heater electrical leads has, heretofore, involved procedures requiring soldering of the wires to the foil leads, or use of connectors which were complicated in structure, clumsy to handle end comparatively expensive to manufacture. Soldered joints, while effective enough insofar as making the electrical connections were concerned, were time consuming to make and susceptible to breakage upon handling. In addition, soldered joints, as well as the more complicated connectors, did not lend themselves to easy disassembly and subsequent reassembly. It can therefore be seen that there exists a real need for a connector for power source wires and thin foil heaters which is simple, durable, compact in structure, inexpensive to make and manufacture, dependable and efficient in use and convenient to handle and store. In addition, such a connector should be so constructed as to permit connection and disconnection from the power source easily and quickly without damage to any of the components and without need for special tools or knowledge. The present invention is directed at providing such a connecting means for power source wires and thin foil heater electrical leads which in use requires a minimum of handling of the foil and incorporates all of the desired features previously stated.

It is therefore a principal object of this invention to provide a connector for joining power source wires and foil heater electrical leads which may be connected or disconnected easily and quickly without special tools and without damage to the foil, wires or the connector. Another object is to provide a two-part connector having pressure means which may be quickly and easily operated to releasably fasten and hold power wires in engagement with thin foil electrical leads to provide a good mechanical and electrical connection. A still further object is to provide a two-part connector having pressure clamping means in the form of a protrusion on the one part of the connector and an oppositely positioned matching detent on the other part for holding the foil electrical leads therebtween securely, eliminating any possibility of contact between the foil leads and the assembly screws. Yet another object of the invention is to provide a simple two-piece connector having longitudinal holes at the seam for receiving power lines, allowing connections to be easily made or broken at any time, without disturbing the clamping hold of the connector on the thin foil electrical leads and without special tools or knowledge and without causing damage to any of the components of the connector, wire or foil.

The invention may be more fully understood and the objects and advantages easily realized by reference to the following description, accompanying drawings, and appended claims in which the novel features of the invention are more particularly set forth.

FIG. 1 is an isometric view showing the assembled connector of this invention with the power source wires and thin foil electrical leads from a diagrammatically shown foil heater connected thereby;

FIG. 2a is a plan view of the underside of the cap 3 of the connector shown in FIG. 1.

FIG. 2b is a plan view of the base portion 2 of the connector shown in FIG. 1.

FIG. 3 is a plan view of the assembled connector, wires and foil electrical leads; and FIG. 4 is a sectional view of the connector taken on the line 4—4 of FIG. 3.

Referring first to the assembly as shown in FIG. 1, there is shown a connector 1 having a base portion 2 and a cap portion 3. The connector may be made by known molding processes from a plastic non-conductive material such as, for example, Bakelite resin, or from other appropriate insulating material. As best seen in FIGS. 1 and 4, the base 2 is provided with a recessed portion 4 adapted to receive foil leads 5a and 5b therein. When the connector is assembled, a protrusion 6 on the cap 3 fits in the recessed portion 4 of the base 2 to clamp foil leads 5a and 5b therein. Ears 7 and 8 carrying holes 9 and 10 extend from one side of the base 2 to provide means for mounting the connector on a supporting surface. As best seen in FIGS. 2a and 2b, holes 11 and 12 in the cap 3 and holes 13 and 14 in the base 2 are provided to receive machine screws 15 and 16 to fasten the cap 3 to the base 2. Also shown in FIGS. 2a and 2b are two longitudinal, parallel grooves 17 and 18 in the face 19 of the base 2. The grooves 17 and 18 extend from opposite ends of the face 19 of the base 2 partially thereacross. Grooves 17 and 18 cooperate with similarly shaped grooves 20 and 21 located in the opposing face 22 of the cap 3 to receive power source wires 23 and 24 therein when the connector is in use. As may be seen by referring to FIGS. 3 and 4, headless screws 25 and 26 are positioned in holes 27 and 28 in the cap 3 directly over the extended uninsulated portions of power source wires 23 and 24 to lock them firmly in place against the foil leads 5a and 5b to form a good electrical as well as a good mechanical connection.

One of the features of the present invention is the ease with which the connector may be installed and used. In the first installation step the connector base 2 is fastened to a wall, floor, panel, etc., with two screws or nails put through the holes 9 and 10 in the base mounting ears 7 and 8. The foil electrical leads 5a and 5b are then laid in recess 4 in the face 19 of the base 2 and the cap 3 is fastened onto the base 2 by means of machine screws 15 and 16. The foil leads are then held securely in place. At any time thereafter the power lines 23 and 24 may be slipped into the openings formed by grooves 17 and 18, 20 and 21 in the base 2 and cap 3, respectively. The power lines 23 and 24 may then be locked in place on the foil leads 5a and 5b by tightening screws 25 and 26 thus forming a good mechanical and electrical connection between the foil and the power lines. The power lines may, of course, be just as easily disconnected by merely loosening screws 25 and 26 and removing wires 23 and 24.

As shown in the attached drawings and described above, the connector of this invention may be used to connect two separate leads from a foil heater or the like with power source wires. It will be obvious to those skilled in the art that the connector of this invention may also be used to advantage in many other ways. For example, when it is necessary or desirable for the leads of the foil heater to be widely separated, two connectors could be used instead of one. In such an installation, only one power wire and one foil lead would be joined in one connector and the other foil lead and the other power wire would be joined in the other connector. Two separate connectors could also be used in a parallel hookup between two foil heaters by overlapping one lead from each heater in one of the connectors and similarly positioning the remaining lead from each foil heater in the other connector, joining one of the power source wires to one connector and the other wire to the other connector. The connectors of this invention may also find use in a series hookup. For example, to connect two foil heaters to a power source in a hookup of this type, four connectors may be used. Each of the four leads from the two foil heaters would be held by a separate connector. The two power source wires would be connected by joining one wire to each of the two end connectors. The two middle connectors would be electrically joined by a connecting wire therebetween.

While a preferred embodiment of the invention has been shown and described, obviously variations and modifications will occur to those skilled in the art to which the invention pertains.

I claim:

1. An improved terminal connector for joining power lines to foil heater leads comprising a two-piece block of non-conducting material consisting of a base portion and a cap portion, one face of said base having thereon a transverse recessed portion and a pair of transversely spaced grooves extending longitudinally one from each end of the face of said base partially across said recessed portion, said cap portion having a transverse projecting portion one one face thereof and a pair of transversely spaced grooves extending longitudinally one from each end of said cap face partially across said projecting portion, said projecting portion and said grooves adapted to, when said cap and base faces are placed in engagement with each other, provide clamping means for a pair of foil electrical leads positioned therebetween and openings in said connector ends at the seam to receive and position one of each of said pair of power line lead wires over and in contact with one of each of said pair of foil leads, said cap portion including openings therein directly over said foil and power line leads and screw means therein adapted to mechanically and electrically secure said power line leads to said foil leads and adapted to release said power line leads therefrom without affecting the hold of the connector on the foil leads or their position therein, said connector including means for maintaining the connector components in proper assembled relationship.

2. A connector for joining power lines to foil heaters comprising an insulating block formed in two pieces consisting of a base section and a cap section each having a shaped face thereon opposing a shaped face on the other section for separable engagement therewith, said base section having a transverse recessed portion extending across the face thereof, said recessed portion being appropriate in size and shape to receive foil electrical leads therein, integral mounting lugs on at least one edge of said base section, a transversely spaced pair of grooves extending longitudinally one from each end of the face of said base section partially across the said recessed portion thereon, a transverse projecting portion extending across the face of said cap portion, said projecting portion being of appropriate size, shape and location to fit into said recessed portion in the face of the base section when said sections are placed together to clamp foil electrical leads therein, said cap having a pair of transversely spaced grooves extending one from each end longitudinally across the cap face and partially across said projecting portion thereon in opposing relationship to the grooves in the face of said base section, said opposing pairs of grooves in said base and cap sections providing, upon placement of said sections together, space therebetween for reception of two power line leads to position them one over each of said foil electrical leads, said cap section being provided with means positioned therein directly above said power line leads and foil electrical leads to press said power line leads onto said foil electrical leads, said means adapted to be released and said power line leads removed from said connector without affecting the connector's hold on the foil electrical leads, said connector being provided with means for holding all of the parts in proper assembled relationship.

3. A terminal connector for mechanically and electrically securing together power line and foil heater electrical leads comprising in combination a generally rectangular block of non-conducting material formed in two sections consisting of a base portion and a cap portion having shaped faces thereon adapted for separable engagement with each other, the shaped face on said base portion comprising a centrally located rectangular transverse recessed portion extending entirely across one face thereof, and a transversely spaced pair of grooves extending longitudinally one from each end of said base face and part of the way across said transverse recessed portion thereon, integral mounting lugs located one adjacent to each end of one longitudinal edge of said base, a centrally positioned transverse rectangular projecting portion on one face of said cap portion, said projecting portion being of proper size and location to snugly fit into said recessed portion on the base face and allow sufficient space for said foil heater leads to be held therebetween when said connector is in assembled form, said cap face having grooves thereon generally similar in size and shape to the grooves in the face of said base and so located as to cooperate with said grooves in the face of said base when the sections are placed together to provide an opening at each end of said connector at its seam, said openings extending longitudinally part way across the length of said connector and providing space between the said base and cap portions for reception of two power line leads to position the uninsulated portion of each across one of the foil electrical leads held in said recessed portion of said base by said projecting portion on the face of said cap when said connector is in use, non-conducting screw pressure means operating through said cap and located directly above and in communication with said openings for said power line leads adapted to hold said power line leads in engagement with said foil electrical leads, said pressure means adapted to be released for removal of said power line leads without affecting the connector's hold on said foil electrical leads, means for holding said cap and base portions of said connector in assembled relationship.

References Cited by the Examiner

UNITED STATES PATENTS 3,038,141 6/1962 Chiuchiolo _____ 339—164
3,150,909 9/1964 Deverell _____ 339—97

JOSEPH D. SEERS, *Primary Examiner.*

W. DONALD MILLER, *Examiner.*